United States Patent [19]
Otsuka et al.

[11] Patent Number: 5,757,843
[45] Date of Patent: May 26, 1998

[54] INDUCTION MELTING SYSTEM INCLUDING GAS EXHAUST

[75] Inventors: Hiroshi Otsuka; Tsuguharu Omori; Michio Kawasaki, all of Kawasaki, Japan

[73] Assignee: Fuji Electric Co., Ltd., Kawasaki, Japan

[21] Appl. No.: 500,067

[22] Filed: Jul. 10, 1995

[30] Foreign Application Priority Data

Jul. 12, 1994 [JP] Japan .................... 6-159714

[51] Int. Cl.⁶ .................... F27D 7/04; F27D 7/06
[52] U.S. Cl. .................... 373/140; 75/10.67; 75/380; 373/7
[58] Field of Search .................... 373/140, 141, 373/6, 7, 8; 75/10.67, 380

[56] References Cited

U.S. PATENT DOCUMENTS

| | | |
|---|---|---|
| 4,227,922 | 10/1980 | Laws et al. .................... 75/10.67 |
| 5,406,579 | 4/1995 | Vallomy .................... 373/77 |
| 5,540,752 | 7/1996 | Spoel .................... 75/380 |

FOREIGN PATENT DOCUMENTS

| | | |
|---|---|---|
| 4-90494 | 3/1992 | Japan . |
| 5-99576 | 4/1993 | Japan . |

*Primary Examiner*—Tu B. Hoang
*Attorney, Agent, or Firm*—Finnegan, Henderson, Farabow, Garrett & Dunner, L.L.P.

[57] ABSTRACT

An annular exhaust gas passage 2 and an airtight retention member 3 for keeping the inside of a crucible induction furnace 1 airtight are installed on the top of the furnace 1, and an exhaust system under atmospheric pressure is connected to a valve 4 via an air duct that penetrates the airtight retention member 3. In addition, a sealing cover 7 that has a valve 8, which can be opened and closed, is used to keep the inside of the furnace airtight, while a system under reduced pressure is connected to the valve 8. These two systems constitute the entire exhaust system.

6 Claims, 4 Drawing Sheets

VAPOR PRESSURE OF VARIOUS METALS

INDUCTION MELTING SYSTEM INCLUDING GAS EXHAUST

BACKGROUND OF THE INVENTION

1. Field of the Invention

The present invention relates to a melting system for a crucible induction furnace for melting raw material including galvanized steel-plate scraps.

2. Description of the Related Art

If raw material including galvanized steel plate scraps is melted, zinc, which is initially in a gaseous phase, is liable to be then cooled and liquefied while penetrating through crucible refractories that have a porosity of about 20%, and often reaches the back of the refractories because zinc has a melting point of 420° C. and an evaporation temperature of 920° C. while cast iron has a melting temperature of 1,500° C.

Although the crucible refractories are still sound and the cast iron itself does not penetrate them at all, the penetration of zinc may cause a run-out detection sensor to malfunction or liquefied zinc may burn the insulation of an induction heating coil, thereby reducing the lifetime of the refractories.

In addition, zinc is readily combined with oxygen, and becomes zinc oxide (ZnO) upon contacting the atmosphere. The zinc oxide then reacts with silica sand ($SiO_2$) that is the main component of the refractories to form a low melting point compound, thereby melting and damaging the refractories to shorten their lifetime. Various inventions have been offered to solve the above problem.

FIG. 1 is an example of a crucible induction furnace for melting raw material including galvanized steel-plate scraps, which is disclosed in Japanese Patent Unexamined Publication No. Hei 5-99576. In this figure, reference numerals 111 and 112 designate refractories and an induction heating coil, respectively.

FIG. 1 shows a crucible induction furnace that can elongate the lifetime of the refractories 111 by limiting the height of molten metal 13 within the crucible to no higher than 1,200 mm to restrain the amount of the molten zinc or zinc gas that penetrates through the pores of the refractories 111.

FIG. 2 shows another example of a crucible induction furnace for melting raw material 15 including galvanized steel-plate scraps, which is disclosed in Japanese Patent Unexamined Publication No. Hei 4-90494. In this example, a crucible induction furnace 201 is housed in a cylindrical container 14 with a bottom, which is equipped with an opening and closing cover 207, and an exhaust device is connected to the top of the cylindrical container 14. With such a structure, the pressure inside the container 14 is reduced to between 400 and 650 hectopascals so that zinc is evaporated, thereby restraining the amount of the molten zinc or zinc gas that penetrates through the pores of the refractories 212. As a result, the lifetime of refractories 212 can be elongated. In FIG. 2, reference numeral 211 designates an induction heating coil.

The examples in FIGS. 1 and 2, which are configured to limit the penetration of zinc through the refractories, are publicly known. If the example in FIG. 1 is applied to a furnace with a capacity of 5 tons or more, it will have a larger inner diameter than those with the same capacity as this furnace to which this example does not apply.

When the inner diameter of the furnace is increased, the thickness of the refractories must be increased to reduce the generation of vertical cracks due to the thermal expansion and shrinkage of the refractories, or the inside of the furnace must be maintained at 500° to 600° C. even while the furnace is not operated in order to reduce the generation of vertical cracks due to the shrinkage of the refractories.

In addition, in the example in FIG. 2, the raw material including galvanized steel-plate scraps, which has a small bulk specific density, is divided into several feeds. In this case, the system is operated in such a manner that a second feed is not supplied until a first feed has almost melted down and the sealing cover is not closed before the entire raw material has been supplied, or the sealing cover is opened and closed and the furnace is vacuumized every time a feed is supplied.

If the sealing cover is not closed until the entire raw material has been supplied, the plant is filled with dust, thereby degrading the working environment.

If the sealing cover is opened and closed and the furnace is vacuumized every time a feed is supplied, the capacity of the vacuum system must be increased to reduce the pressure inside the furnace to between 400 and 650 hectopascals in a short time.

SUMMARY OF THE INVENTION

The present invention has been made to solve the foregoing problems, and an object of the invention is to provide a dezincing induction melting system that includes an exhaust system with a small capacity which exhausts some zinc gas and dissolved gas by using two systems: a system under atmospheric pressure and a system under reduced pressure.

A first aspect of the invention has been achieved by the provision of a dezincing induction melting system comprising a crucible induction furnace for melting raw material including galvanized steel-plate scraps, a sealing cover for said crucible induction furnace which has an opening and closing means and an exhaust port, and can seal the inside of crucible, and an exhaust system for exhausting an exhaust gas within the furnace through said exhaust port, wherein the exhaust gas within the furnace is exhausted under atmospheric pressure until the furnace can be sealed using the sealing cover after completing the supply of the raw material, and the exhaust gas is then exhausted under reduced pressure after it has become possible to seal the furnace using the sealing cover.

A second aspect of the invention has been achieved by the provision of a dezincing induction melting system according to the first aspect of the invention, comprising two systems: an exhaust system under atmospheric pressure comprising an exhauster and a hollow exhaust gas passage that surrounds the top of the crucible induction furnace and has at least one inlet port on a vertical surface inside the furnace; and an exhaust system under reduced pressure comprising a sealing cover and a pressure-reducing pump.

A third aspect of the invention has been achieved by the provision of a dezincing induction melting system according to the first or second aspect of the invention, wherein the exhaust system under atmospheric pressure comprises an exhauster and a gap between the sealing cover and the crucible.

If the melting process in a crucible induction furnace is divided into the melting period from the completion of the feed of raw material until it melts down and the temperature-rising period during which the temperature of the molten material rises until the adjustment of the components is finished, and the discharge period, a large amount of gas containing dust is discharged during the melting period because oil and dust sticking to the material are burned during the melting period.

In addition, during the temperature-rising period, some of the zinc evaporation gas and the dissolved gas contained in the molten metal is discharged.

The gas discharged during the melting period is discharged by the exhaust system under atmospheric pressure, and the gas discharged during the temperature-rising period is discharged by the exhaust system under reduced pressure.

BRIEF DESCRIPTION OF THE DRAWINGS

The above and other objects and features of the present invention will be more apparent from the following description taken in conjunction with the accompanying drawings.

DETAILED DESCRIPTION OF THE PREFERRED EMBODIMENTS

Figure 1:
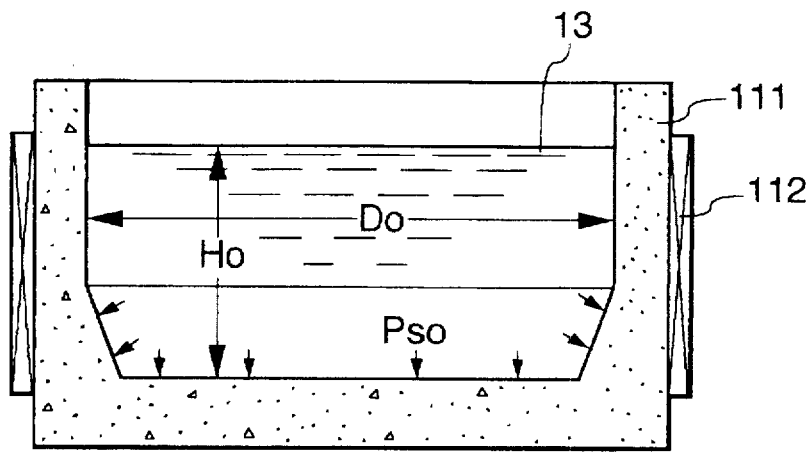
FIG. 1 is a cross section showing a conventional crucible induction furnace.
Figure 2:
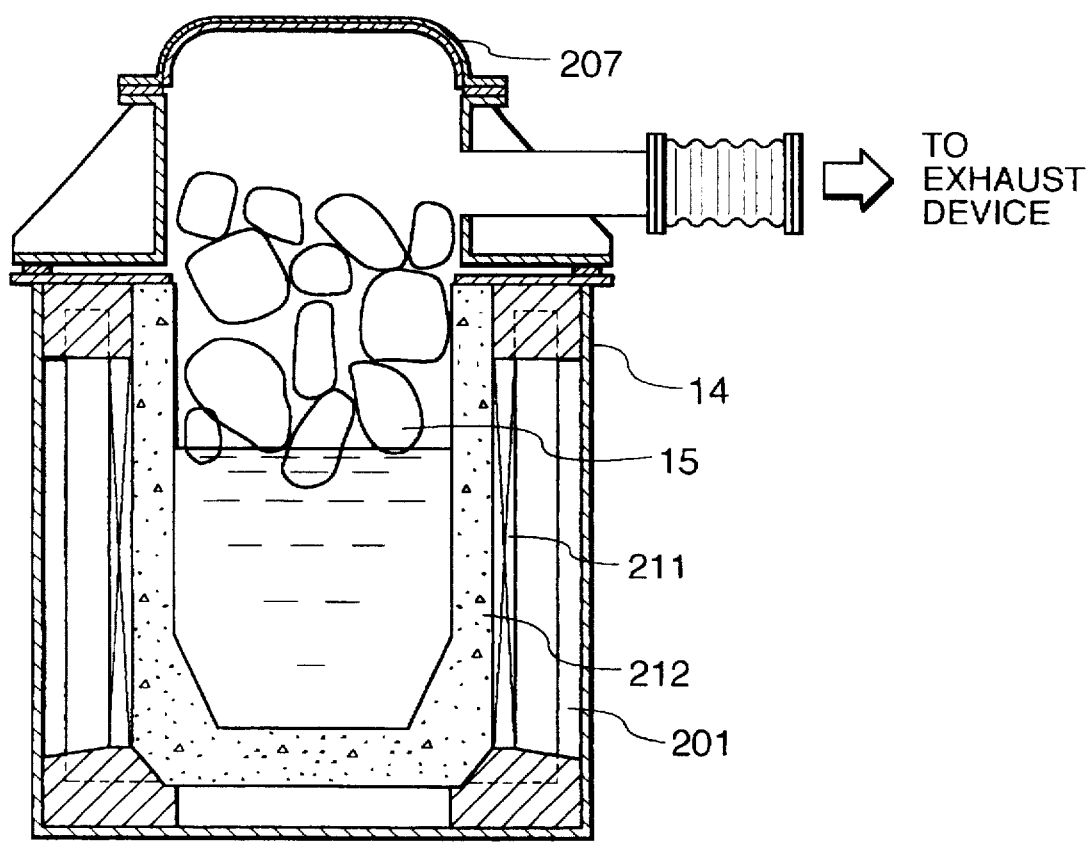
FIG. 2 is a cross section showing another conventional crucible induction furnace.
Figure 3:
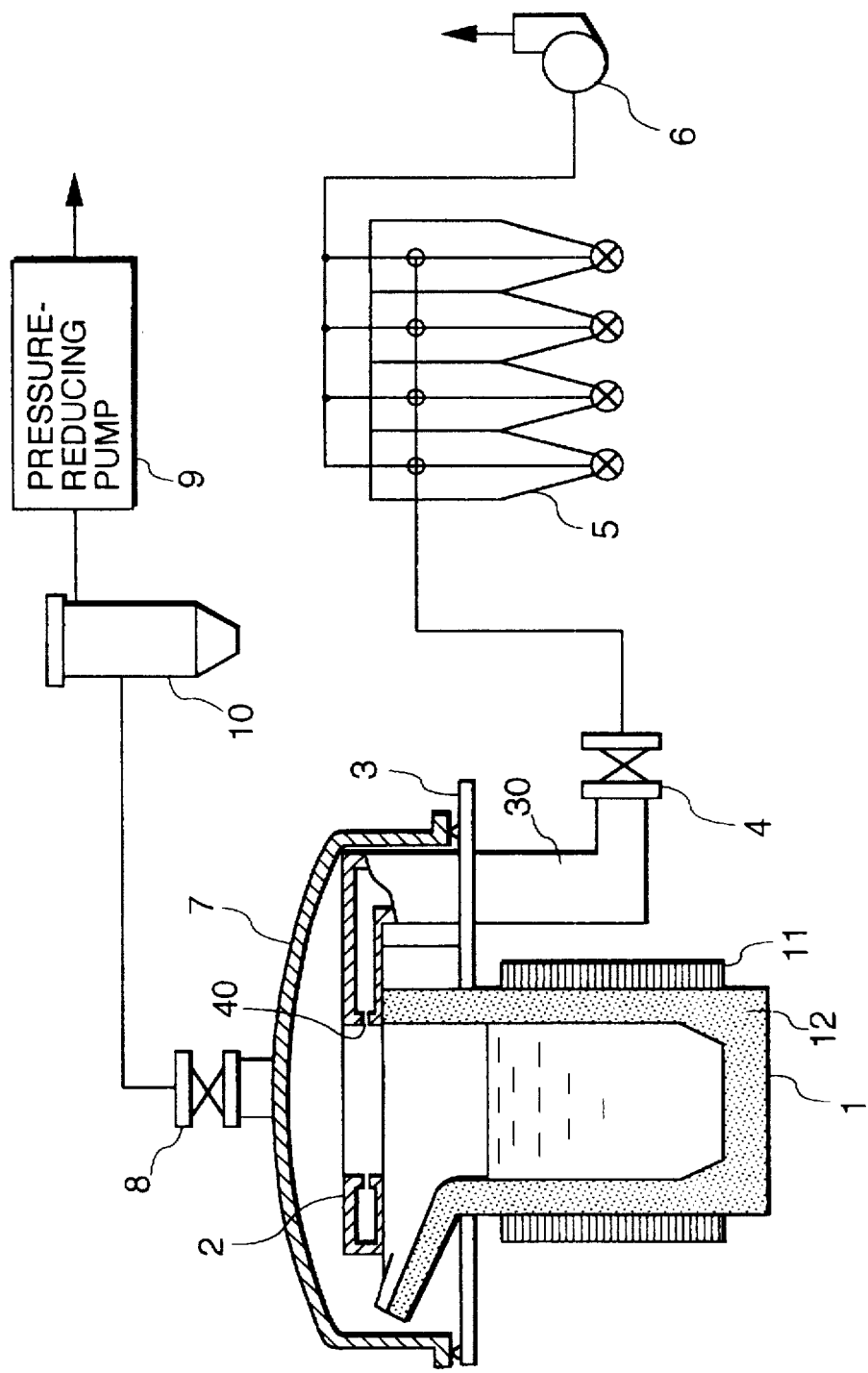
FIG. 3 is a block diagram showing a dezincing induction melting system according to an embodiment of this invention.
Figure 4:
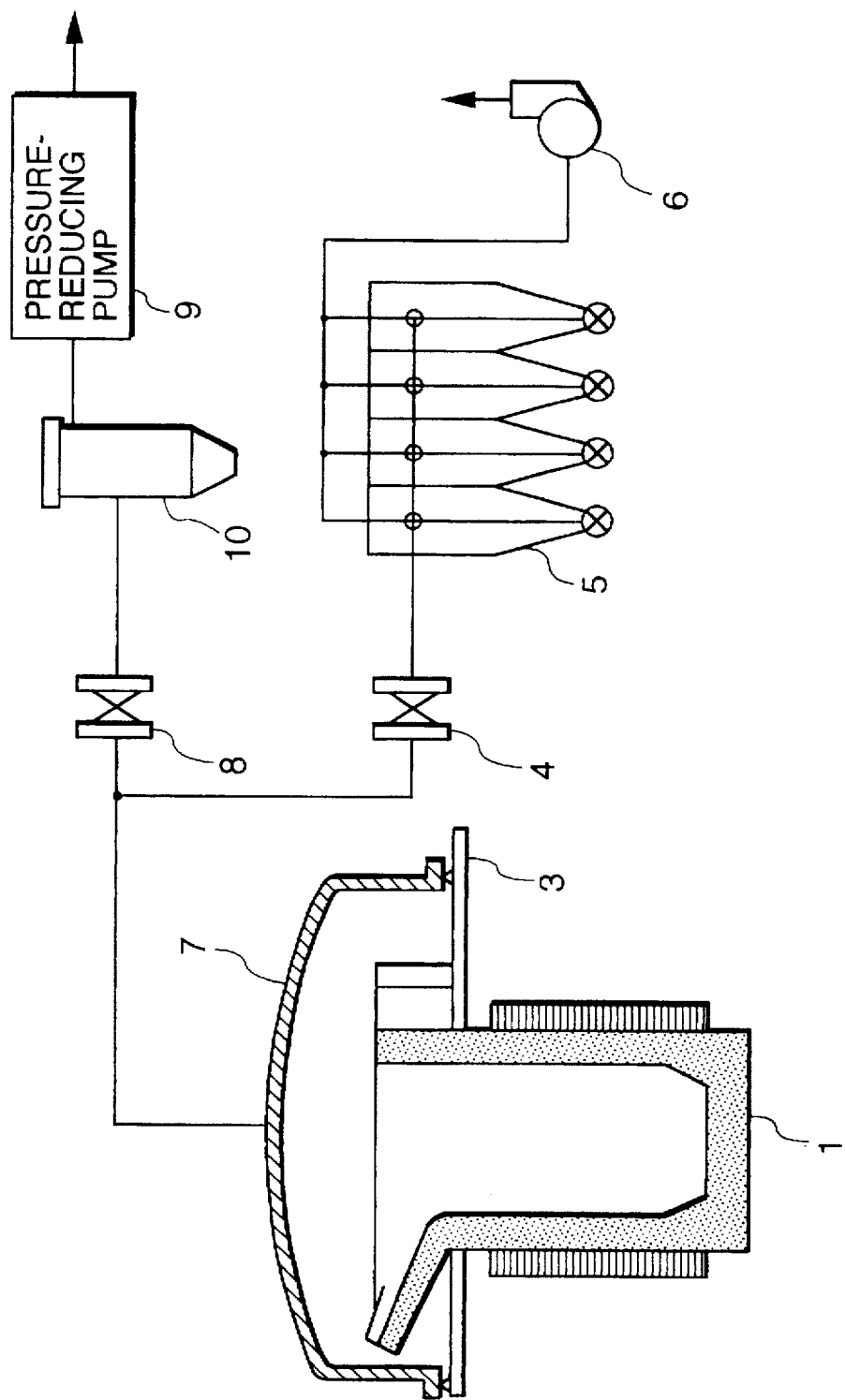
FIG. 4 is a block diagram showing a dezincing induction melting system according to another embodiment of this invention.

FIG. 3 is a block diagram showing a dezincing induction melting system in accordance with an embodiment of this invention, and FIG. 4 is a block diagram showing a dezincing induction melting system in accordance with another embodiment of this invention. In these figures, members denoted by the same reference numerals as in the conventional examples have the substantially same functions as the corresponding members in those conventional examples. Therefore, their descriptions will be omitted.

In FIG. 3, reference numeral 1 designates a crucible induction furnace, and 2 is a hollow annular exhaust gas passage, which is installed at the top of the furnace 1, having one or more exhaust gas inlet ports 40 on a vertical surface inside the furnace 1. The annular exhaust gas passage 2 is connected to an air duct 30 that penetrates an airtight retention member 3 attached to the top of the furnace 1, thereby keeping the inside of the furnace 1 airtight, and is connected to a valve 4.

The valve 4 has a joint (not shown) fitted loosely and rotatably thereto, and is connected through a dust collector 5 to an exhauster 6.

Reference numeral 7 designates a sealing cover that can be opened and closed, which has a valve 8 on a top thereof, and which is located on the airtight retention member 3 via a seal (not shown).

Reference numeral 9 designates a pressure-reducing pump, and 10 is a dust collector used in the system under reduced pressure.

With the above structure, the dust-collecting exhaust system is comprised of a system for collecting mainly dust of carbon (C) and iron (Fe), and a system for collecting zinc oxide.

Next, the operation of the melting system thus constituted will be described.

During a melting period between the feeding of raw material and the completion of melting, that is, from a time when raw material is fed into the furnace 1 until it is completely melted, thereby making it possible to close the furnace 1 using the sealing cover 7, the sealing cover 7 is opened to allow a large amount of generated dust to pass via the annular exhaust gas passage 2 through the valve 4 as well as the dust collector 5 to the exhauster 6, where the dust is collected. During the subsequent temperature-rising and heat-retaining periods since the temperature of the molten raw material rises until the components have been completely adjusted, that is, after it has become possible to close the furnace 1 using the sealing cover 7, the sealing cover 7 is closed to keep the inside of the furnace 1 airtight, and the pressure-reducing pump 9 is used to reduce the pressure inside of the furnace 1 through the dust collector 10 and the valve 8, making it possible to actively collect all zinc remaining within the molten metal.

The embodiment shown in FIG. 4 differs from that shown in FIG. 3 in that the annular exhaust gas passage 2 is omitted and in that during the melting period, the sealing cover 7 is slightly opened to provide a gap between the sealing cover 7 and the airtight retention member 3 so that the outside air can enter the furnace 1 through the gap to ensure a sufficient air quantity in order to increase the flow velocity of the gas being sucked from the holes (not shown) of the sealing cover 7 via the valve 4. During the temperature-rising and heat-retaining periods, however, the sealing cover 7 is completely closed to keep the inside of the furnace 1 airtight, and the pressure-reducing pump 9 is used to reduce the pressure inside the furnace 1 via the dust collector 10 and the valve 8, thereby making it possible to actively collect all remaining zinc within the molten material.

Figure 5:
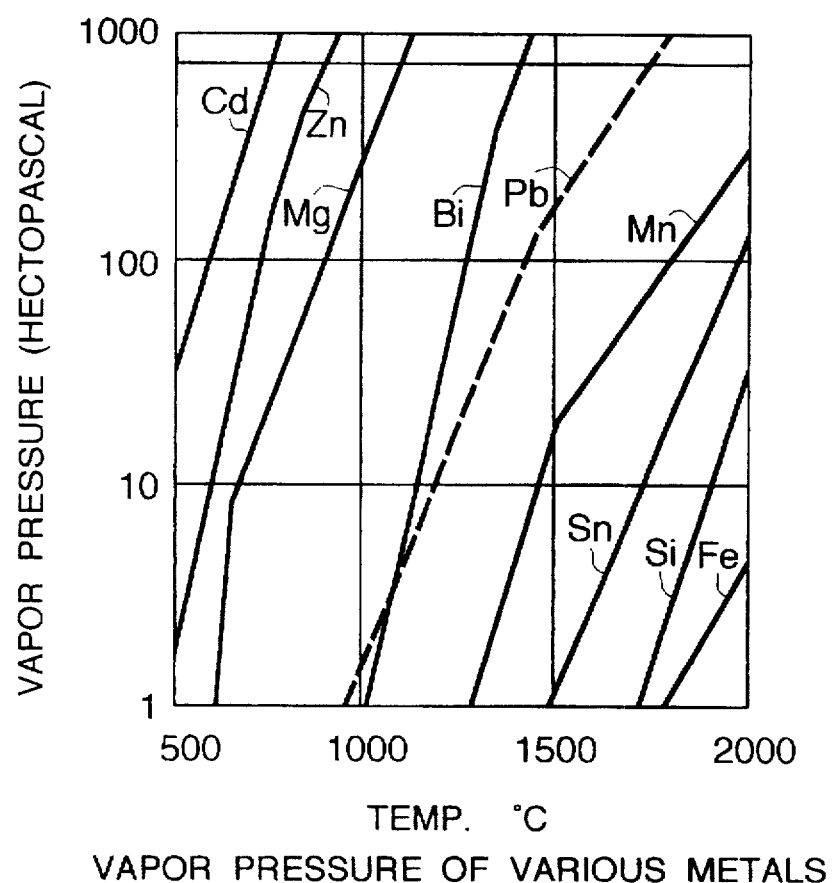
FIG. 5 is a graph representing the relationship between the heating temperature and the vapor pressure of various metals.

FIG. 5 is a graph representing the relationship between the heating temperature and vapor pressure of various metals. This figure indicates that zinc has a much higher vapor pressure than iron, and very easily evaporates at the melting temperature of cast iron (about 1,500° C.).

According to this invention, an exhaust system comprises two systems, so that the capacity of the system functioning under reduced pressure may be reduced. In addition, the separation of normal dust collection from zinc dust collection enables zinc to be reused because most of the dust collected by the system under reduced pressure is zinc or zinc oxide.

Furthermore, with the normal and zinc dust collection systems, a pressure-reducing device in the furnace requires only a small amount of air and can thus be reduced in size.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An induction melting system comprising:
   a crucible induction furnace for melting material including galvanized steel-plate scraps;
   sealing means for sealing an inside of said furnace; and
   first and second exhaust means in communication with the inside of the furnace for selectively exhausting gas from said furnace through said sealing means, said first and second exhaust means including means for controlling flow through the first and second exhaust means, said first exhaust means placing the inside of said furnace under a first pressure during a first period and including
an exhaust gas passage having a first end portion in fluid communication with the inside of said furnace and a second end portion in fluid communication with an exhauster, said first end portion of the exhaust gas passage extending inside the furnace and including an annular portion surrounding a top potion of said furnace and having at least one inlet port, said second exhaust means placing the inside of said furnace under a second pressure during a second period and including
a pressure-reducing pump.

2. The induction melting system as claimed in claim 1, wherein said first pressure is atmospheric pressure and said first period is from when the material is supplied to said furnace to when said sealing means seals the inside of said furnace, and wherein said second pressure is below atmospheric pressure and said second period is after said sealing means seals the inside of said furnace.

3. The induction melting system as claimed in claim 1, wherein said first exhaust means includes an exhaust gas passage having one end portion in fluid communication with the inside of said furnace, another end portion of said exhaust gas passage being in fluid communication with the exhauster.

4. The induction melting system as claimed in claim 3, wherein said exhaust gas passage extends inside the furnace and includes an annular portion surrounding a top portion of said furnace, said exhaust passage having at least one inlet port inside said furnace.

5. The induction melting system as claimed in claim 1, wherein said first exhaust means exhausts the gas from said furnace while the sealing means is spaced from the furnace to form a gap between said sealing means and said furnace.

6. The induction melting system as claimed in claim 1, wherein said flow controlling means comprises a first valve in said first exhaust means and a second valve in said second exhaust means.

* * * * *

UNITED STATES PATENT AND TRADEMARK OFFICE
CERTIFICATE OF CORRECTION

PATENT NO. : 5,757,843
DATED : May 26, 1998
INVENTOR(S) : Hiroshi OTSUKA et al.

It is certified that error appears in the above-identified patent and that said Letters Patent is hereby corrected as shown below:

Claim 1, Column 5, line 13, "potion", should read --portion--.

Signed and Sealed this

Twenty-second Day of June, 1999

Q. TODD DICKINSON

*Attest:*

*Attesting Officer*    *Acting Commissioner of Patents and Trademarks*